Patented Dec. 9, 1947

2,432,394

UNITED STATES PATENT OFFICE 2,432,394

1-ACYLOXY-2-ALKYLBUTADIENE-1,3 COMPOUNDS

Joseph B. Dickey, Rochester, N. Y., and Clarence G. Stuckwisch, Wichita, Kans., assignors to Eastman Kodak Company, Rochester, N. Y., a corporation of New Jersey No Drawing. Application February 9, 1946, Serial No. 646,709

5 Claims. (Cl. 260—494)

This invention relates to 1-acyloxy-2-alkylbutadiene-1,3 compounds and to a method for their preparation. More specifically, it relates to diene compounds of the general formula:

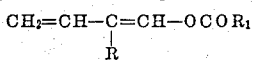

wherein R represents an alkyl group, for example, methyl, ethyl, propyl, butyl, amyl, isopropyl, and $R_1$ represents an alkyl group, an alkoxyalkyl group such as methoxymethyl, ethoxymethyl, a halogen substituted alkyl group, for example, monochloromethyl, monobromomethyl, dichloromethyl, trichloromethyl, trifluoromethyl, and groups such as furyl, tetrahydrofurfuryl, naphthenyl, aminosulfone or alkylsulfone groups.

The compounds above defined are valuable intermediates for chemical reactions of transformation and polymerization reactions. The preparation of such polymers are described in co-pending application, in the name of J. B. Dickey, N. J. Bowman and C. G. Stuckwisch, Serial No. 646,708, filed of even date herewith.

In the preparation of the compounds of our invention, there can be employed as intermediate compounds unsaturated aldehydes of the formula:

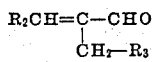

wherein $R_2$ represents hydrogen or an alkyl group and $R_3$ represents an alkyl group, the specific aldehyde being reacted with an isopropenyl compound such as isopropenyl acetate or with an aliphatic acid anhydride, in the presence of a basic salt including for the most part an alkali metal salt of the reaction acid. Cupric acetate in smaller amount is employed as a polymerization inhibitor. The proportion of reactants can be present in varying amounts, but preferably one molecular proportion of the aldehyde is reacted with one or more molecular proportions of the aliphatic acid anhydride, in the presence of about 0.5 to 3 molecular proportions of the basic material consisting in greater proportion of an alkali metal salt of the aliphatic acid. The unsaturated aldehyde can be, for example, an alpha- or beta-substituted acrolein or an alpha-substituted crotonaldehyde prepared, in general, as described for alpha-methyl crotonaldehyde in the Canadian Journal of Research, 6 284 (1932), and alpha-ethyl acrolein, Annalen 434 145 (1923). The acid anhydride can be, for example, acetic, propionic, butyric, valeric, palmitic, furoic, tetrahydrofuroic, methoxyacetic, phenylacetic, succinic, chloroacetic, fluoroacetic, trichloroacetic, difluoroacetic, benzoic, abietic, aminosulfonacetic or methylsulfonacetic anhydride.

It is, accordingly, an object of this invention to provide new 1-acyloxy-2-alkylbutadiene-1,3 compounds. Another object is to provide a method for preparing the same. Other objects will become apparent hereinafter.

The following examples will serve to illustrate our new compounds and the manner of obtaining the same.

*Example I. 1-acetoxy-2-methylbutadiene-1,3*

222 grams of alpha-ethyl acrolein, 382 grams of acetic anhydride, 174 grams of sodium acetate and 2 grams of cupric acetate were refluxed with stirring for 12 hours and then poured into water and stirred 4 hours. The oily layer obtained was separated and fractionated at reduced pressure. The 1-acetoxy-2-methyl-1,3-butadiene thus obtained had a boiling point of 92° C. at 40 mm. pressure. The analysis gave 66.21 per cent by weight of carbon, 7.45 per cent by weight of hydrogen and 33.5 per cent by weight acetyl as compared to calculated theoretical of 66.67 per cent carbon, 7.93 per cent hydrogen and 34.1 per cent acetyl. In place of alpha-ethyl acrolein in the above example, there can be substituted alpha-methyl crotonaldehyde.

*Example II. 1-propionoxy-2-methyl butadiene-1,3*

222 grams of alpha-ethyl acrolein, 468 grams of propionic anhydride, 204 grams of anhydrous sodium propionate and 2 grams of cupric acetate were refluxed with stirring for 12 hours and then poured into water and stirred for 8 hours. The oily layer obtained was separated and fractionated at reduced pressure. The product, 1-propionoxy-2-methyl-1,3-butadiene, boiled at 110° C. at 40 mm. pressure.

*Example III. 1-trifluoroacetoxy-2-methyl butadiene-1,3*

222 grams of alpha-ethyl acrolein, 682 grams of trifluoroacetic anhydride, 411 grams of sodium trifluoroacetate and 2 parts of cupric acetate were refluxed with stirring for 8 hours and then poured into water and stirred for 4 hours. The oily layer obtained was separated and fractionated at reduced pressure. The product, 1-trifluoroacetoxy-2-methyl-1,3-butadiene, boiled at 78° C., at 40 mm. pressure.

*Example IV. 1-acetoxy-2-butyl-butadiene-1,3*

63 alpha-ethyl-beta-propylacrolein, 50 grams of isopropenyl acetate and 6 drops of sulfuric acid were heated on a steam bath with a take off reflux condenser. After about 30 c. c. of acetone had distilled over, the acid was neutralized, and the product distilled over under reduced pressure. The 1-acetoxy-2-butyl-butadiene-1,3 boiled at 101–105° C. at 22 mm. pressure.

Other 1-acyloxy-2-alkylbutadiene-1,3 compounds were also prepared by the procedure of the above examples including 1-acetoxy-2-ethylbutadiene-1,3, 1-acetoxy-2-propylbutadiene-1,3, 1-acetoxy-2-amylbutadiene-1,3, 1-acetoxy-2-isopropylbutadiene, 1-methoxyacetoxy-2-methylbutadiene-1,3, 1-ethoxyacetoxy-2-methylbutadiene-1,3, 1-chloroacetoxy-2-butylbutadiene-1,3, 1-bromoacetoxy-2-methylbutadiene-1,3, 1-dichloroacetoxy-2-methylbutadiene-1,3, 1-trichloroacetoxy-2-methylbutadiene-1,3, 1-difluoroacetoxy-2-methylbutadiene-1,3, 1-difluorachloroacetoxy-2-ethylbutadiene-1,3, 1-tetrahydrofuroyloxy-2-propylbutadiene-1,3, 1-naphthenoyloxy-2-methylbutadiene-1,3, 1-aminosulfonacetoxy-2-methylbutadiene-1,3, 1-methylsulfonacetoxy-2-methylbutadiene-1,3, and similar kinds of compounds.

What we claim is:

1. The process which comprises reacting an aldehyde having the formula:

$$R_2-CH=C-CHO$$
$$\phantom{R_2-CH=C-}|$$
$$\phantom{R_2-CH=}C_2H_5$$

wherein $R_2$ represents a member selected from the group consisting of a hydrogen atom and an alkyl group having from 1 to 3 carbon atoms, with the acid anhydride of a saturated fatty acid of from 2 to 4 carbon atoms, in the presence of an alkali metal salt of the fatty acid.

2. The process which comprises reacting an aldehyde having the formula:

$$CH_2=C-CHO$$
$$\phantom{CH_2=C-}|$$
$$\phantom{CH_2=}C_2H_5$$

with the acid anhydride of a saturated fatty acid of from 2 to 4 carbon atoms, in the presence of an alkali metal salt of the fatty acid, and cupric acetate.

3. The process which comprises reacting alpha-ethylacrolein with acetic anhydride, in the presence of sodium acetate and a smaller portion of cupric acetate.

4. The process which comprises reacting alpha-ethyl acrolein with propionic anhydride, in the presence of sodium propionate and cupric acetate.

5. The process which comprises reacting alpha-ethyl acrolein with trifluoroacetic anhydride, in the presence of sodium trifluoroacetate and cupric acetate.

JOSEPH B. DICKEY.
CLARENCE G. STUCKWISCH.

REFERENCES CITED

The following references are of record in the file of this patent.

UNITED STATES PATENTS

| Number | Country | Date |
|---|---|---|
| 2,021,698 | Perkins | Nov. 19, 1935 |
| 2,073,363 | Caruthers et al. | Mar. 9, 1937 |
| 2,215,180 | Kaufler | Sept. 17, 1940 |

FOREIGN PATENTS

| Number | Name | Date |
|---|---|---|
| 723,773 | Germany | Aug. 10, 1942 |
| 740,367 | Germany | Oct. 19, 1943 |